March 5, 1935.   A. W. CARPENTER ET AL   1,993,085
OPTICAL PRINTER
Filed June 10, 1931   4 Sheets-Sheet 3
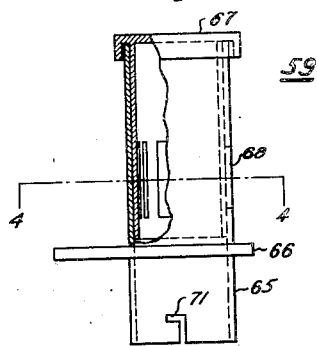
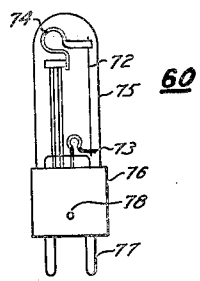
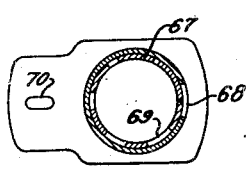
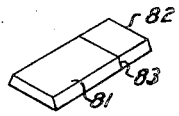
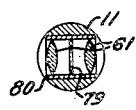
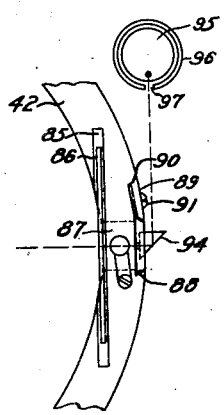
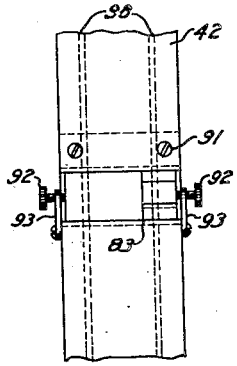
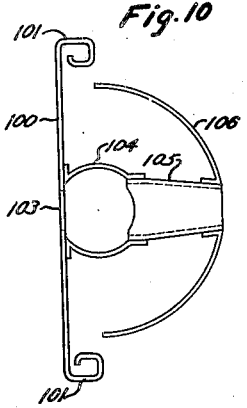
INVENTORS
Arthur W. Carpenter
Maurice G. Ricker
BY Harris D. Hineline
ATTORNEY March 5, 1935. A. W. CARPENTER ET AL 1,993,085
OPTICAL PRINTER
Filed June 10, 1931  4 Sheets-Sheet 4

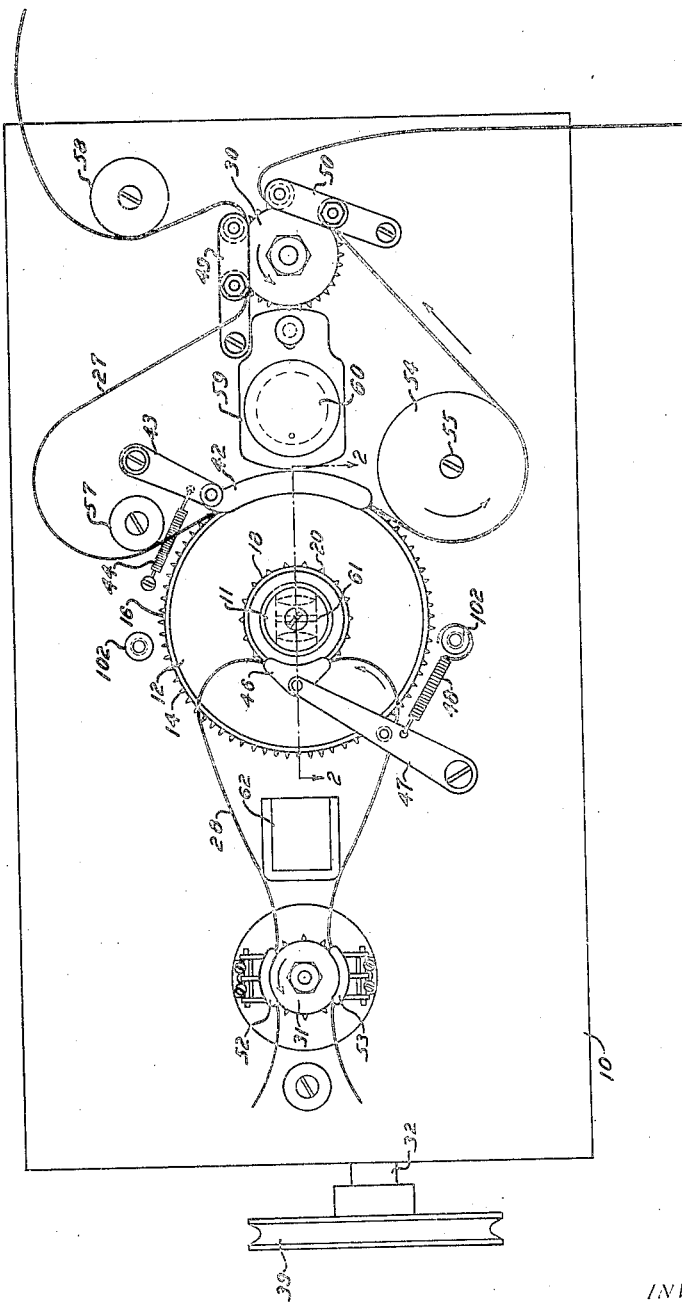

INVENTORS
Arthur W. Carpenter
Maurice G. Ricker
BY Harris D. Hineline,
ATTORNEY

UNITED STATES PATENT OFFICE 1,993,085

OPTICAL PRINTER

Arthur W. Carpenter and Maurice G. Ricker, New York, N. Y., assignors to United Research Corporation, Long Island City, N. Y., a corporation of Delaware Application June 10, 1931, Serial No. 543,324

17 Claims. (Cl. 88—24)

This invention relates to optical printing and particularly to improvements in continuous optical printers for photographic films and the like.

In the art of printing strips of photographic film it has been proposed to move image bearing and sensitized films by common driving means and to place a lens between the image bearing and sensitized films for optically projecting images from the former to the latter. In printers of this type wherein the projecting lens is disposed at the center of and between the halves of a film moving sprocket, it has been necessary to operatively connect the sprocket halves in some manner other than by an axial shaft or hub, because the hub space is occupied by the lens.

Such printers have been structurally limited to the printing of images of the same size as the original images, that is, the only possible ratio of printing therein has been one to one. When printed films have been desired of a size differing from that of the image bearing film the printing operation has been performed between portions of the films other than the portions in engagement with the film moving sprockets. None of the proposed printers have been entirely satisfactory because of unsteady motion or vibrations imparted to the films by the film moving sprockets, by the driving means for the sprockets, or by the operating connections between the sprocket halves.

The above mentioned difficulties have been overcome by the present invention, which has for an object the printing of images or photographic records from one film to another, by optical projection, with greater accuracy than has heretofore been achieved.

Another object is to print photographic film records differing in size from existing records, in that type of printer in which films move in co-axial paths and images are projected through the axis from one film to another film.

A further object is to project images from illuminated portions of an image-bearing film and to print corresponding images on corresponding portions of a sensitized film while said films are moved uniformly and steadily in co-axial paths at relative speeds depending upon the relative sizes of the projected and printed images.

These objects are accomplished by causing one of the films to drive another of the films through power transmitting means.

The means for transmitting power from the driving film to the driven film may comprise a plurality of film guiding members or sprocket wheels rotatable on a common axis and arranged to keep the paths of travel and speeds of the films in predetermined positive relation to each other and to an image projecting device disposed between the films. By this arrangement very steady movement of the films may be obtained with no perceptible shifting of the image bearing film with respect to the sensitized film during the period of exposure.

Means may be provided for moving the films toward and from the guiding members, such as ordinary feed sprockets which engage the films over two portions of their peripheries. That portion of the driving film which is moving from the guiding members or sprocket wheels to its feed sprocket is in tension and transmits energy from the feed sprocket to the sprocket wheels. A steadier and more uniform movement of the sprocket wheels and the films may be obtained by providing a vibration absorbing device or mechanical filter and causing it to engage the tension portion of the driving film. Loops are provided in the other portions of the films which are adjacent the sprocket wheels to absorb any vibration which may be transmitted to the films by the feed sprockets.

When a printer is desired having a printing ratio of one to one, all of the films should be in engagement with the sprocket wheels at the same distance from the axis of rotation thereof, and the engaging means such as the sprocket teeth may be common to all of the films. When the desired printing ratio is other than one to one a plurality of means are provided on each sprocket wheel for engagement with the respective films at distances from the axis of rotation proportional to the speeds of the films, the said speeds being in direct proportion to the respective sizes of the images, measured along the length of the films. Since no rotating connection is needed between the sprocket wheels a narrow film which is adapted to carry small images thereon can pass between the portions of the sprocket wheels which engage a wider film adapted to carry larger images and, in the absence of such connections, there need be no interference with the direct passage of light from one film to another.

A further object of the present invention is to simultaneously print from a plurality of films to another film. This object is accomplished by arranging one of the films to drive a plurality of film guiding members, the other films being driven thereby, in definite spaced relation thereto.

The invention also contemplates the printing of a plurality of positive films from a single negative film, which is accomplished by disposing a plurality of printers, as described, in parallel relation, supplying a sensitized film to each printer and passing a single negative film through two or more of the printers in series, said negative film driving the sprocket wheels of the printers.

In printers of the type contemplated by this invention it is desirable to strongly illuminate that portion of an image-bearing film from which images are being projected. It is, therefore, a further object of this invention to direct an intense light upon a portion of the image-bearing film which is in engagement with the sprocket wheels. This is accomplished by disposing an incandescent lamp, having a linear filament, closely adjacent the peripheries of the sprocket wheels and the image-bearing film in engagement therewith, and transverse to the film. The distance between the film and the lamp filament is reduced by providing the lamp with a substantially cylindrical, transparent envelope and mounting the filament therein in an eccentric position near the wall of said envelope.

For the purposes of this specification an image-bearing film may be referred to as a negative film or negative, and a sensitized film may be referred to as a positive film or positive, it being understood that the terms negative and positive are merely relative. An image may be any variation in density of a film or of the emulsion carried thereby. The term includes pictures, sound records, written matter, and the like. The term lens is used in this specification to describe any suitable light refracting element or combination of such elements. A nodal point of a lens is a point in the lens axis about which the lens may be rotated on a perpendicular axis without displacing the image formed by the lens.

Other objects and structural details of this invention will be apparent from the following description when read in connection with the figures of the accompanying drawings wherein:—

Fig. 1 represents one embodiment of the invention and shows the preferred form of optical printer with one sprocket wheel removed for clearness;

Figure 11:
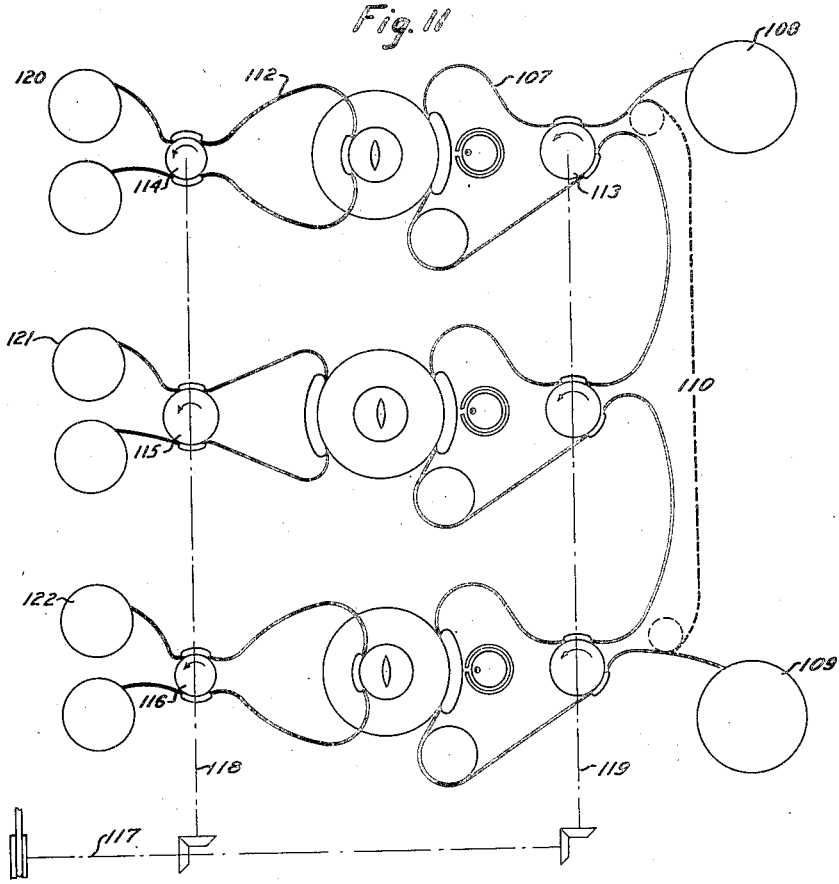
Figure 2:
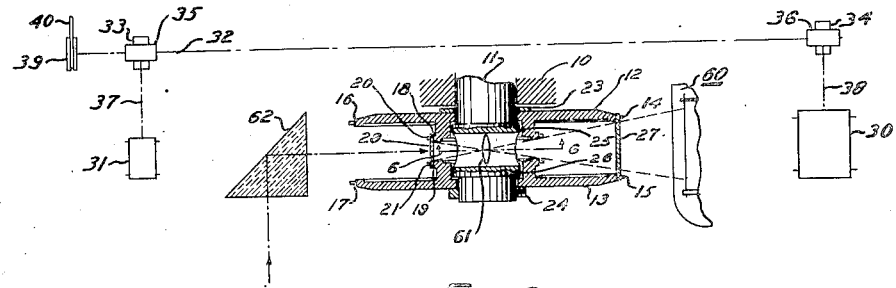
Fig. 2 is a plan view, partly in section, on line 2—2 of Fig. 1 with both sprocket wheels in place, and with other parts of the printer shown diagrammatically.
Figure 12:
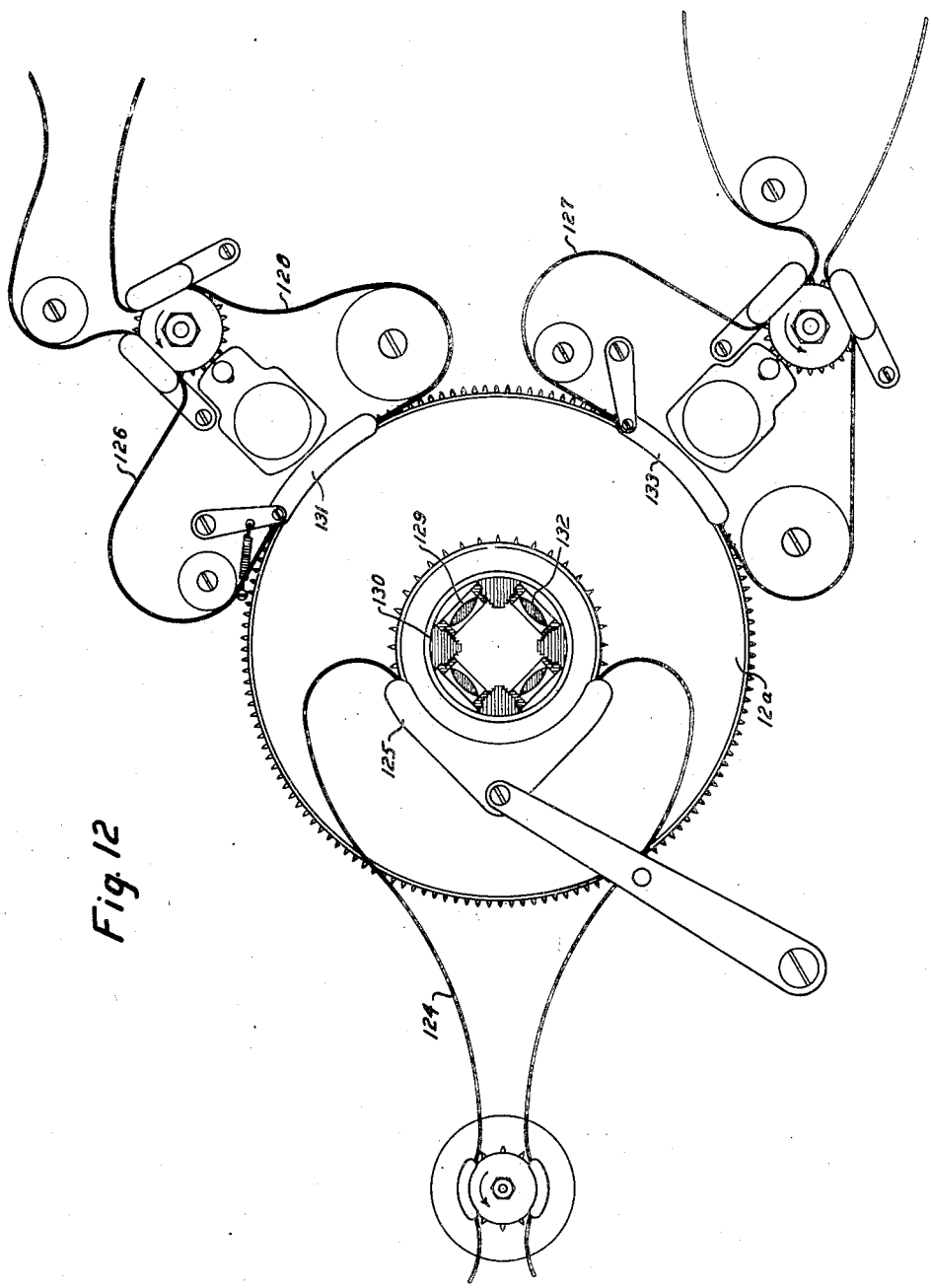

Figures 3 to 10 inclusive show in detail various parts of the printer shown in Fig. 1;

Figs. 3 and 4 are elevation and plan views, respectively, of a lamp housing, Fig. 4 being a section on line 4—4 of Fig. 3;

Fig. 5 represents the preferred type of lamp;

Fig. 6 represents a section on line 6—6 of Fig. 2, and shows a lens disposed in an aperture in the shaft of the sprocket wheels;

Fig. 7 represents a light filter;

Figs. 8 and 9 are respectively front and side views of a modification wherein a separate source of light is used for printing the sound track;

Fig. 10 represents a light shield which may be disposed between the sprocket wheels;

Fig. 11 is a diagrammatic view of a plurality of printers such as shown in Fig. 1, arranged for printing a plurality of positives from a single negative;

Fig. 12 represents a modified form of printer in which images on separate negative films can be printed on a single positive film.

Referring to Figs. 1 and 2 reference character 10 indicates a panel or other suitable support which is preferably made of solid metal having considerable mass. A shaft 11 may be secured to panel 10 and project therefrom in a substantially perpendicular direction. Sprocket wheels 12 and 13 are mounted for free rotation preferably on shaft 11, the peripheries of the sprocket wheels being provided with suitable means for engaging film, such as rows of sprocket teeth 14 and 15, which protrude from pitch surfaces 16 and 17, respectively. When a printer is desired which will print from a large film to a small film, or vice versa, for instance from a standard 35 millimeter film to a standard 16 millimeter film, additional pitch surfaces 18 and 19 are provided on sprocket wheels 12 and 13, respectively. These pitch surfaces are provided with film engaging means such as rows of teeth 20 and 21. The sprocket wheels are mounted on the shaft 11 so that the rows of teeth having the smaller diameter face each other. Shaft 11 is provided with means, such as collars 23 and 24 and shoulders 25 and 26, for preventing sprocket wheels 12 and 13 from moving in an axial direction on shaft 11. The collar or washer 23 bears against panel 10 or a projection thereon. The distance in an axial direction between rows of sprocket teeth 14—15 is made equal to the distance between the rows of sprocket holes in a film 27 which is to engage the sprocket teeth. Similarly the distance between rows of sprocket teeth 20—21 is made equal to the distance between the rows of sprocket holes in a film 28 which is to be engaged by teeth 20—21.

To the right and left of sprocket wheels 12—13 film moving devices are provided, such as feed sprockets 30 and 31 respectively. Sprocket 30 is provided with rows of teeth suitable for engagement with film 27 and sprocket 31 is provided with teeth suitable for engagement with film 28. The feed sprockets 30 and 31 are preferably mounted on shafts which are journaled in panel 10 and driven from behind the panl by suitable common drive means which will positively maintain the relative speeds of rotation of the sprockets. The drive means may consist of a shaft 32 having gears 33 and 34, which mesh, respectively, with gears 35 and 36 on the feed sprocket shafts 37 and 38. Shaft 32 may be driven by any suitable means such as pulley 39 connected by a belt 40 to an electric motor or other source of power.

Means are provided for guiding and keeping film 27 in engagement with sprocket wheels 12—13, the rows of teeth 14—15 engaging, respectively, the rows of sprocket holes provided near the edges of the film 27. The guiding means may comprise an aperture gate 42 attached to an arm 43 which is hingedly mounted on panel 10 and resiliently retained in position, as by spring 44. Similar means are provided for guiding and keeping film 28 in engagement with the rows of sprocket teeth 20—21, such as a shoe or aperture gate 46 attached to arm 47, and held against the sprocket wheels by spring 48. Guide rolls of the usual type as indicated at 49 and 50 may be provided to keep film 27 in engagement with feed sprocket 30. Similarly the shoes or pads 52 and 53 serve to guide and keep film 28 in engagement with feed sprocket 31.

At a point in the travel of film 27 from the sprocket wheels 12—13 to feed sprocket 30, a mechanical filter is provided, preferably in the form of a solid metal pulley 54 having a smooth cylindrical surface and mounted for free rotation on a shaft 55 in such position that film 27 upon leaving sprocket wheels 12—13 can be frictionally engaged by the pulley 54. Guide rollers 57 and 58 are provided where and when desired for keeping film 27 in its proper path of travel.

A housing 59 containing a source of light 60 is disposed closely adjacent gate 42 and on a line passing through the aperture in gate 42 and the center of shaft 11. A lens 61 is so disposed between sprocket wheels 12—13 that it will project an image of that portion of film 27 which is in the aperture of gate 42 to a portion of film 28 which is passing between the pitch surfaces 18—19 and the shoe 46. At a point diametrically opposite the lamp 60 a reflecting prism 62 may be provided for viewing the image formed by lens 61. This prism is useful for focusing the image on film 28 as will be explained later.

Figs. 3 and 4 show the details of lamp housing 59. It is preferably of tubular construction comprising an outer tube 65 provided with a flange 66 for mounting on panel 10 with a portion of tube 65 extending through the panel, and an inner tube 67, closed at one end, slidable within tube 65. Outer tube 65 is provided with a single slot 68 which is aligned with the aperture in gate 42 when lamp housing 59 is positioned on panel 10. Inner tube 67 is provided with a plurality of slots such as 69 of various widths but all of substantially the same length as slot 68. By rotating tube 67 within tube 65 any one of the slots in tube 67 may be aligned with slot 68. An elongated hole 70 is provided in flange 66 so that the position on panel 10 of the lamp housing may be adjusted relative to gate 42.

Fig. 5 shows the preferred construction of the lamp 60 which provides illumination for the printing operation. This lamp has a linear filament 72 supported at both ends, as by a stiff support 73 and spring support 74. The latter is provided to keep filament 72 straight regardless of changes in its length due to changes in temperature. The filament and its supports are mounted in a transparent envelope or bulb 75 which is preferably cylindrical in shape. Instead of positioning filament 72 approximately in the center of the envelope 75, it is disposed for the purpose of this invention, adjacent the wall thereof, to bring the filament closer to film 27 as it passes through aperture gate 42. Lamp 60 may be provided with a base 76 similar to the bases used for vacuum tubes and having pins such as 77 for making electrical connections to filament 72. A pin 78 may be provided in the side of the base for positioning the lamp within housing 59, this pin cooperating with slot 71 in the housing.

Fig. 6 shows a cross section of shaft 11 with lens 61 mounted therein. The lens may consist of one or more lens elements made of suitable optical glass which will provide a lens of high quality and of the proper focal length to project images from film 27 to film 28. Lens 61 may be provided with an iris diaphragm 79 for adjusting the amount of light passing therethrough and the sharpness of the image formed thereby, as is well known in the art. For convenience in adjusting the lens 61 within shaft 11, all of the lens elements and diaphragm 79 may be mounted in a tubular housing 80.

Fig. 7 represents a filter which may be placed between the lamp 60 and film 27 to provide light of the proper quality and color for printing. When the film 27 carries both a picture record and a sound record, it has been found desirable to provide different filters for the two records. The filter illustrated in Fig. 7 is made up of two parts 81 and 82, having different light transmitting qualities or different colors. Filter parts 81 and 82 are preferably made of glass and cemented or otherwise secured together for ease in handling and adjusting. The joint 83 should be very thin because the space on a film between the pictures and the sound track is usually very narrow.

In Figs. 8 and 9 a portion of the preferred form of aperture gate 42 is shown in detail. A slot 85 is formed in the gate and provided with a light spring 86 so positioned that it presses against the edge of film 27 as it passes the printing aperture 87, thereby keeping the sprocket holes of the film in contact with one side of the sprocket teeth. This is desirable to prevent the lateral shifting of the film permitted by the clearance between the sprocket holes in film 27 and the sprocket teeth 14—15. On the convex side of gate 42 a dovetail slot 88 is provided for receiving filters such as shown in Fig. 7. A tongue 89 is formed by cutting another slot 90 adjacent the dovetail slot thereby providing, with screws 91, a simple device for clamping filters in position. Means are provided for laterally shifting the filter, such as thumbscrews 92 supported on the gate 42 by adjustable links 93. Thus a micrometer adjustment of the filters is obtained so that the dividing line 83 (Fig. 7) between the filters may be properly positioned relative to film 27. In the modification shown in Figures 8 and 9 the portion of the filter which is in alignment with the sound track is provided with a reflector or prism 94 suitably secured to a filter glass 82 or otherwise attached to a picture filter such as 81. A second light source 95 and housing 96 are disposed directly above the prism 94 so that light from lamp 95 passing through slot 97 is reflected by the prism and is directed through the aperture gate 42 to the sound track on film 27. Grooves 98 in the aperture gate 42 provide clearance for the rows of sprocket teeth 14—15.

To confine the light to a direct path between films 27 and 28 it is desirable to place a light shield between sprocket wheels 12 and 13. A satisfactory type of shield is illustrated in Fig. 10. It may be made of any suitable material, preferably sheet metal, and comprises a substantially straight portion 100 having eyes such as 101 which fit over studs 102 on panel 10, thereby supporting the shield between the sprocket wheels without touching them. Straight portion 100 is provided with an aperture 103 which is disposed in front of film 28. A circular portion 104 of the shield partly surrounds shaft 11 and is connected by tubular piece 105 to semi-circular portion 106 which conforms roughly to the peripheries of the sprocket wheels. When the shield is in position tubular piece 105 is aligned with lens 61 and the aperture 87 in gate 42.

The correct position of lens 61 may be determined as follows: A strip of negative film having images thereon is placed between the gate 42 and sprocket wheels 12—13, and a strip of clear film having a ground surface is placed between shoe 46 and the sprocket wheels. A suitable current is then supplied to lamp 60 and the image of the negative film formed on the strip of ground film is observed in prism 62 through an aperture in shoe 46. Lens 61 is then adjusted until a sharp image is obtained on the ground film. This adjustment is not critical if the lens has considerable depth of focus. The sprocket wheels and films are then rotated slowly until a point on the negative film near one edge of aperture 87 (Fig. 8) has reached the other edge thereof, and the image of this point on the strip of ground film is checked to determine whether it has shifted in position relative to the film. Lens 61 is then carefully adjusted so that no such shifting of the image occurs. The desired condition is obtained when a nodal point of lens 61 lies in the axis of rotation of the sprocket wheels 12—13.

With lens 61 properly adjusted the operation of the printer shown in Figs. 1 to 10 inclusive, is as follows: The film 27 from which prints are to be made is threaded over roller 58, over feed sprocket 30, roller 57, and engaged with the teeth of sprocket wheels 12—13, leaving a loop of film between the sprocket and wheels. It is then passed around the heavy pulley 54 and under sprocket 30 to a suitable rewinding reel (not shown). A sensitized film 28 from a suitable reel (not shown) is threaded under feed sprocket 31, between sprocket wheels 12—13 and shoe 46, engaged with teeth 20—21 on these wheels and then threaded over sprocket 31 to a suitable rewinding device (not shown), leaving a loop on each side of the sprocket wheels. A source of power connected to pulley 39 will then move films 27 and 28 by means of sprockets 30 and 31, respectively, through shaft 32 and the connecting gears. It is readily seen, therefore, that the two films will have definite relative speeds regardless of the actual speed of shaft 32. A counter clockwise rotation of sprocket 30 takes up any slack in film 27 between sprocket 30 and sprocket wheels 12—13 as the film passes around pulley 54. The tension thus created in film 27 causes the sprocket wheels 12—13 to rotate. The frictional contact between film 27 and pulley 54 combined with the inertia of the pulley smooths out any slight variations in the movement of film 27 caused by the teeth of sprocket 30 or by the gears 34 and 36. Since film 28 is in engagement with the rows of sprocket teeth 20—21, the wheels 12—13 will move film 28.

The speed of film 27 in its passage through the printer is determined by the peripheral speed of sprocket 30 and, since the incoming and outgoing portions of film 27 are engaged by sprocket 30, the loop in film 27 will be maintained. It is preferable to space the teeth on sprocket 30 and in each of rows 14—15 the same center to center distance as the holes in film 27. The respective numbers of teeth will then be in proportion to the pitch diameters of sprocket 30 and pitch circles 16—17. The number of sprocket holes per picture frame in film 28 may be different than in film 27. The diameter of pitch circles 18—19 should, however, be in proportion to the diameter of pitch circles 16—17, as the desired center to center distance between two picture frames on film 28 is to the corresponding distance on film 27. If the teeth on pitch circles 18—19 and on sprocket 31 are spaced the same distance apart as the holes in film 28 their respective numbers of teeth will be proportional to their pitch diameters. The peripheral speeds of feed sprockets 31 and 30 should be in the same proportion, as determined by the ratios of gears 33—35 and 34—36, and the respective pitch diameters of sprockets 31 and 30, as the peripheral speed of pitch circles 18—19 is to that of pitch circles 15—16. Then the linear speeds imparted to film 28 by sprocket 31 and sprocket wheels 12—13 will be equal and the loops in film 28 will be maintained. If film 27 is a standard 35 millimeter film and film 28 is a 16 millimeter film, the ratio of the diameters of pitch circles 16—17 and 18—19 should be 5 to 2, because the picture frames on such films measure respectively three-quarter inches and three-tenths inches center to center. There are, however, four holes per frame along each edge of a 35 millimeter film and only one hole per frame in a 16 millimeter film, so the ratio of the number of teeth in rows 14—15 and 20—21 should be 4 to 1, if the teeth are spaced to engage every sprocket hole.

The exposure of the sensitized film may be controlled in several ways, namely: (a) by controlling the temperature of the filament 72 in lamp 60; (b) by rotating tube 67 of lamp housing 59 thereby admitting more or less light from filament 72 to film 27; (c) by varying the speed of rotation of shaft 32 thereby varying the speed of both films 27 and 28; and (d) by changing the size of the opening in diaphragm 79 of lens 61.

When printing picture films it is often desirable to make the positive pictures softer than the negative pictures. To do this the light filter 81 is made of ground glass and if a color filter is desired, the filter 81 may be made of glass of the proper color. The sound track on the other hand should be clear and sharp. Hence filter 82 may be omitted entirely, may be made of clear glass, or may be made of colored glass, as desired. In the modification shown in Figs. 8 and 9, wherein separate light sources are used for printing the picture record and the sound record, more latitude of adjustment is possible and conditions may be controlled to give the best results for each type of record.

In the production of motion pictures one or more negative or master films are made, from which a considerable number of positive films are printed for use in motion picture projecting machines in theatres, etc. Every time the negative film is run through a printer and rewound, it is slightly scratched and worn, until it must finally be discarded. The life of a negative film may be greatly extended and many more prints obtained therefrom by using a number of printers as shown in Fig. 11. A negative film 107 may then be unwound from a reel 108, passed through the printers in succession, and rewound on a reel 109, or the film may be made endless and returned from the last printer to the first printer, a suitable takeup device (not shown) being provided at some point 110 in the return path. Each printer which is in operation is provided with a separate sensitized film such as 112. All of the feed sprockets such as 113 for negative film 107 must have the same peripheral speed. The feed sprockets 114, 115, 116, for the sensitized films move their respective films at speeds in proportion to the ratios of printing of their respective printers. For uniformity, however, it is desirable to revolve all of the feed sprockets 114, 115, 116 at the same rate, the diameter of the sprockets being selected to give the proper speed of sensitized film in each printer. Common driving means may then be provided, such as by shaft 117 and counter shafts 118 and 119 suitably connected thereto by gears. Any other known means for driving a plurality of sprockets at the same or positively related speeds may be used, such as a plurality of synchronous motors connected to a common source of current. Means for driving takeup reels 109, 120, 121 and 122, are not shown as such means are well known in the art.

In the production of talking motion picture films it is sometimes desirable to make the negative picture records and negative sound records on separate films which, however, are synchronously related so that, if they are stated at the proper points and moved at the proper relative speeds, the sound and picture records will be in synchronism throughout the full lengths of the films. In the reproduction of talking motion pictures it is desirable to have both the picture and the sound records side by side on the same film. The modified form of printer shown in Fig. 12 makes possible the printing of records from two negative films to a single positive film. In this modification the mechanism for moving a sensitized film 124 is substantially the same as that disclosed in Fig. 1, except that the shoe 125 which is similar to shoe 46 in Fig. 1 covers a greater arc on the sprocket wheels one of which is indicated by reference character 12a, the other having been removed. The mechanism for moving each of the negative films 126 and 127 is substantially the same as the mechanism for moving film 27 in Fig. 1; these mechanisms being spaced on the circumferences of the sprocket wheels such as 12a, preferably ninety degrees apart. It is desirable that only one of the negative films, preferably picture film 127, should drive the sprocket wheels, therefore, in threading up the films sufficient slack 128 is left in the other film 126 so that, instead of driving the sprocket wheels, film 126 is driven by them. A lens 129 is disposed in the shaft 130 in alignment with the aperture gate 131 for film 126, which may be a sound film, and a second lens 132 is positioned in shaft 130 in alignment with aperture gate 133 for film 127. The lens elements which make up lenses 129 and 132 are spaced apart so that no lens element is disposed at the point of intersection of the two light beams. The aperture in gate 131 is made equal in width to the sound track on film 126 and the aperture in gate 133 is made equal in width to the pictures on film 127, the sound and picture records occupying the same relative positions on films 126 and 127 respectively as they would occupy if disposed on a single film. Hence the records on the two negative films may be printed separately on the positive film 124 without interference. Any desired space relation between the printed pictures and the corresponding sound record on film 124 may be obtained by threading up the picture film 127 and the sound film 126 in the proper relative positions, allowance being made for the distance between the exposure points on film 124.

The printers shown in the drawings may be reducing or enlarging printers depending on which of the films bear the photographic records and the positions of the printing lamps, but it should be understood that it is within the scope of this invention to engage rows of sprocket teeth 14—15 with both the negative and positive films to obtain a printing ratio of one to one, as indicated diagrammatically in the center printer of Fig. 11. In any of the printers described herein the sensitized films may be arranged to drive the sprocket wheels, if desired, the negative film then being driven thereby.

The embodiments of the invention illustrated and described herein have been selected for the purpose of clearly setting forth the principles involved. The invention is, however, susceptible of being further modified to meet different conditions encountered in its use, and it is therefore intended that the appended claims cover all modifications within the spirit and scope of the invention.

We claim:

1. A photographic printer comprising a plurality of independently movable members, a single fixed shaft on which said members are mounted, means carried by each of said members for engaging a plurality of films, said means having different speeds of movement in predetermined ratio, and one of said films comprising means for rotating said members in unison.

2. A continuous optical printer comprising a pair of freely rotatable sprocket wheels, a feed sprocket and a film, wherein the feed sprocket moves the film and the film rotates said wheels, and means frictionally engaging said film over a portion thereof intermediate said feed sprocket and said wheels for absorbing vibrations imparted to said film by said feed sprocket.

3. A photographic device comprising a film, a feed sprocket adapted to engage and move different portions of said film in different directions, a pair of spaced sprocket wheels adapted to be engaged and rotated by portions of said film intermediate the portions thereof engaged by said feed sprocket, and means engaging said film for preventing the transmission to said sprocket wheels of vibrations imparted to said film by said feed sprocket.

4. An optical printer comprising two spaced sprocket wheels arranged to turn freely about a common axis, means for moving a film towards and away from said wheels, means for engaging said film with said wheels and causing them to be moved by said film, means for moving a second film toward and away from said wheels, means for engaging the said film with said wheels and causing it to be moved by said wheels, and a freely rotating pulley having relatively high inertia disposed between said first mentioned film moving means and said wheels and frictionally engaging said film whereby the movements of said wheels and said films at the points of engagement therewith are made steady and continuous.

5. An optical printer comprising two spaced members arranged to rotate about a common axis, means cooperating with said members for guiding and moving a sensitized film, on said members means cooperating with said members for guiding on said members a plurality of separate record-bearing films each in definite spaced relation to said sensitized film, means for illuminating a portion of each record bearing film, and means for simultaneously projecting light from the said illuminated portions to said sensitized film.

6. In combination, means for moving a picture film, a sound film and a sensitized film in definite circular paths about an axis whereby the centers of curvature of said films meet substantially at the same point on said axis; means for illuminating portions of the picture and sound films; a lens disposed between the picture film and the sensitized film, and a second lens disposed between the sound film and the sensitized film whereby picture and sound images may be simultaneously projected from said picture and sound films respectively, to said sensitized film.

7. An arrangement for printing a plurality of positive films from a single negative film, comprising a plurality of optical printers disposed in substantially parallel relation, each printer comprising a pair of sprocket wheels adapted to engage and move a sensitized film and means for moving the negative film towards and away from each of said pairs of wheels; common driving means for all of said negative film moving means, and means in each of said printers for causing said sprocket wheels to be engaged and moved by said negative film, whereby the said negative film is passed successively through each printer in printing relation to the sensitized film therein.

8. In combination, a substantially rigid support, a shaft secured to said support, a plurality of spaced sprocket wheels freely rotatable on said shaft, means for moving a film toward and away from said sprocket wheels, means for moving a sensitized film toward and away from said sprocket wheels, common drive means for both said film-moving means, means for engaging the said films and sprocket wheels whereby the sprocket wheels are driven by one of the films and drive the other film, a source of light disposed adjacent the first mentioned film and arranged to illuminate a transverse portion thereof, and means disposed between two of the said sprocket wheels and between the said films for projecting an image of the illuminated portion of the first mentioned film to the sensitized film.

9. The combination defined in claim 8 and a freely rotating pulley having high inertia relative to the inertia of the film moving means, said pulley being in contact over a portion of its circumference with that part of the first mentioned film which is moving away from said sprocket wheels and toward its moving means.

10. The combination defined in claim 8, and means comprising a prism disposed adjacent said sprocket wheels and diametrically opposite said light source, whereby said image may be observed.

11. A continuous projection printer comprising the combination of a driving film, a driven film, means for transmitting power from said driving film to said driven film and means for projection printing from one of said films to the other film.

12. A reduction printer comprising a driving film, a driven film, means comprising an optical system for projection printing from one of said films to the other, and means comprising a driving connection between said films whereby said films are adapted to travel at different rates of speed.

13. A photographic printer comprising a single non-rotatable shaft, two spaced sprocket wheels journaled to turn independently on said shaft about a common axis, each of said wheels having two sets of sprocket teeth disposed, respectively, on pitch circles the diameters of which are in the ratio of 5 to 2, said wheels being so disposed on said shaft that the rows of teeth of the smaller diameter are adjacent, and a lens within an aperture in said shaft and having conjugate foci at the cylindrical surfaces defined, respectively by said large and small pitch circles.

14. An optical printer comprising rotatable members having co-axial sprocket teeth, means for guiding onto and away from said teeth one positive film in printing relation to a plurality of other films, means for supporting said members whereby said members are rotated by tension on one of said films, a plurality of lenses disposed between said members with their axes intersecting the said axis of rotation, and means for illuminating said other films whereby images therefrom are projected on said positive film by said lenses.

15. An optical printer comprising two spaced members arranged to turn freely and independently on a common axis, non-rotatable supporting means common to both of said members for rotatably supporting said members, means cooperating with said members for guiding films in definite circular paths about said axis, means for illuminating one of said films, and means for projecting light from the illuminated film through an aperture in said shaft to another of said films.

16. An optical printer comprising a unitary non-rotatable shaft, means for non-rotatably supporting said shaft, said shaft projecting beyond said supporting means, the projecting end of said shaft having a transverse aperture therethrough, a lens in said aperture, a film sprocket in separate half portions rotatably mounted on said shaft, retaining means on said shaft at opposite sides of said aperture for holding said sprocket halves apart thereby providing an optical path through said aperture and between said sprocket halves, and complementary sprocket teeth on said sprocket halves.

17. An optical printer comprising a unitary non-rotatable shaft, means for non-rotatably supporting said shaft, said shaft projecting beyond said supporting means, the projecting end of said shaft having a transverse aperture therethrough, a lens in said aperture, a film sprocket in separate half portions rotatably mounted on said shaft, retaining means on said shaft at opposite sides of said aperture for holding said sprocket halves apart thereby providing an optical path through said aperture and between said sprocket halves, a set of sprocket teeth at the periphery of each of said sprocket halves, a second set of sprocket teeth of smaller diameter than said first mentioned sprocket teeth on each of said sprocket halves, a film engaging said peripheral sprocket teeth, a second film engaging said sprocket teeth of smaller diameter, a source of printing light for said films, and means for pulling one of said films to thereby rotate said sprocket halves and traverse the other of said films across said aperture.

ARTHUR W. CARPENTER.
MAURICE G. RICKER.